Jan. 4, 1927.　　　　　　　　　　　　　　　　　　　1,613,217
W. J. ARMSTRONG
APPARATUS FOR TESTING RADIATOR CORES
Filed March 19, 1925　　　6 Sheets-Sheet 1

INVENTOR.
Wesley J. Armstrong
By Parker & Prochnow
ATTORNEYS.

Jan. 4, 1927.
W. J. ARMSTRONG
1,613,217
APPARATUS FOR TESTING RADIATOR CORES
Filed March 19, 1925   6 Sheets-Sheet 2
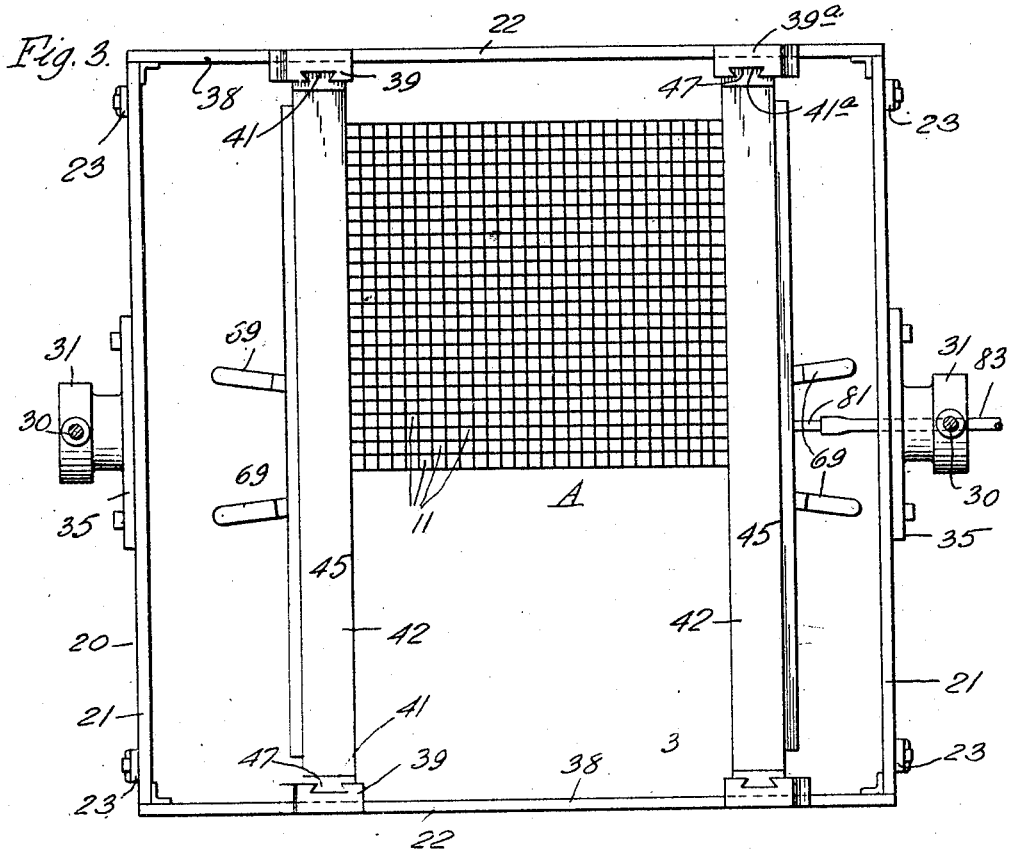
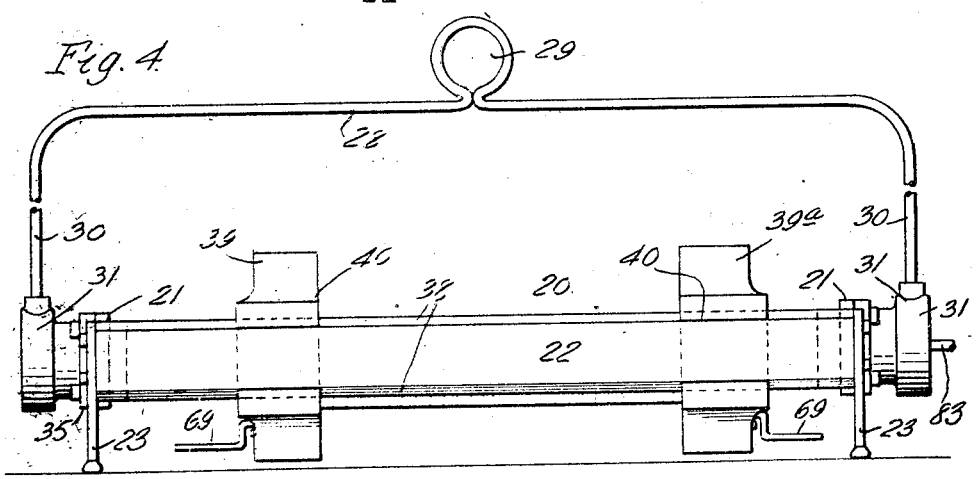
INVENTOR.
Wesley J. Armstrong
By Parker & Bochrow
ATTORNEYS.

Jan. 4, 1927.  
W. J. ARMSTRONG  
1,613,217  
APPARATUS FOR TESTING RADIATOR CORES  
Filed March 19, 1925  6 Sheets-Sheet 3

INVENTOR.  
Wesley J. Armstrong.  
By Parker & Brochwow.  
ATTORNEYS.

Jan. 4, 1927.
W. J. ARMSTRONG
1,613,217
APPARATUS FOR TESTING RADIATOR CORES
Filed March 19, 1925     6 Sheets-Sheet 4
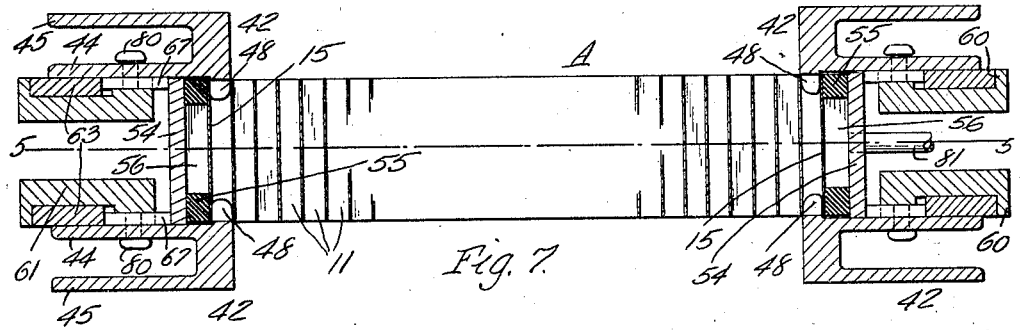
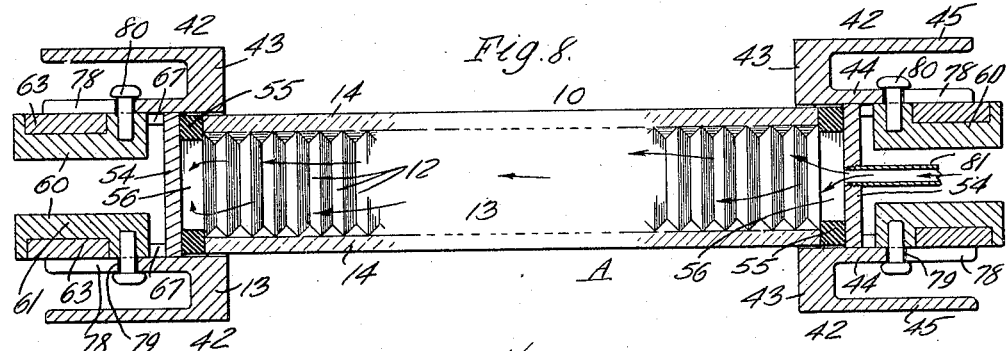
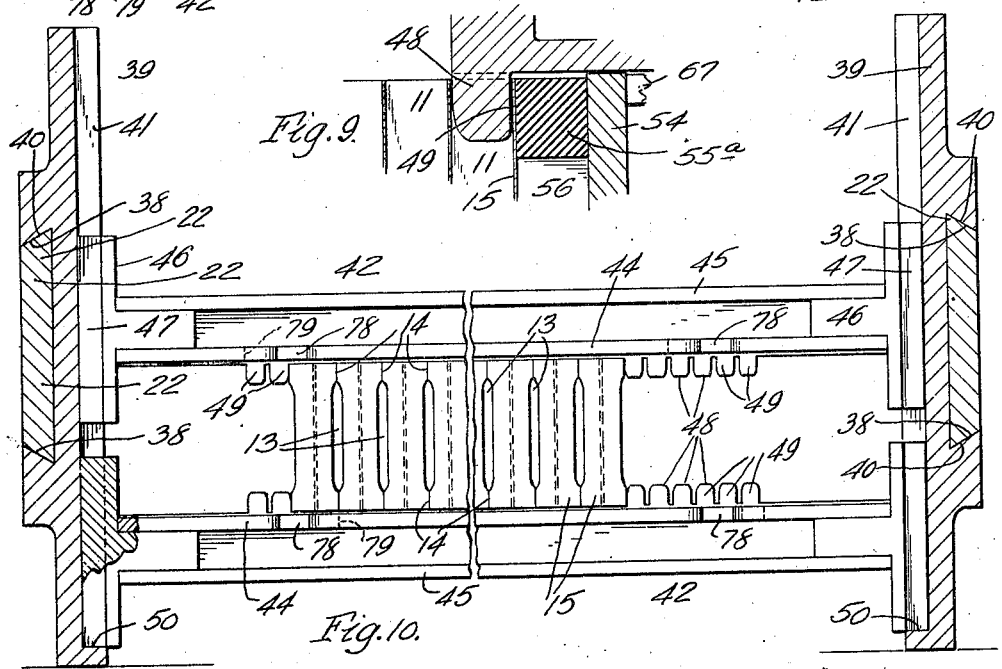
INVENTOR.
Wesley J. Armstrong
by Parker & Brockwow
ATTORNEYS.

Jan. 4, 1927. 1,613,217
W. J. ARMSTRONG
APPARATUS FOR TESTING RADIATOR CORES
Filed March 19, 1925    6 Sheets-Sheet 5
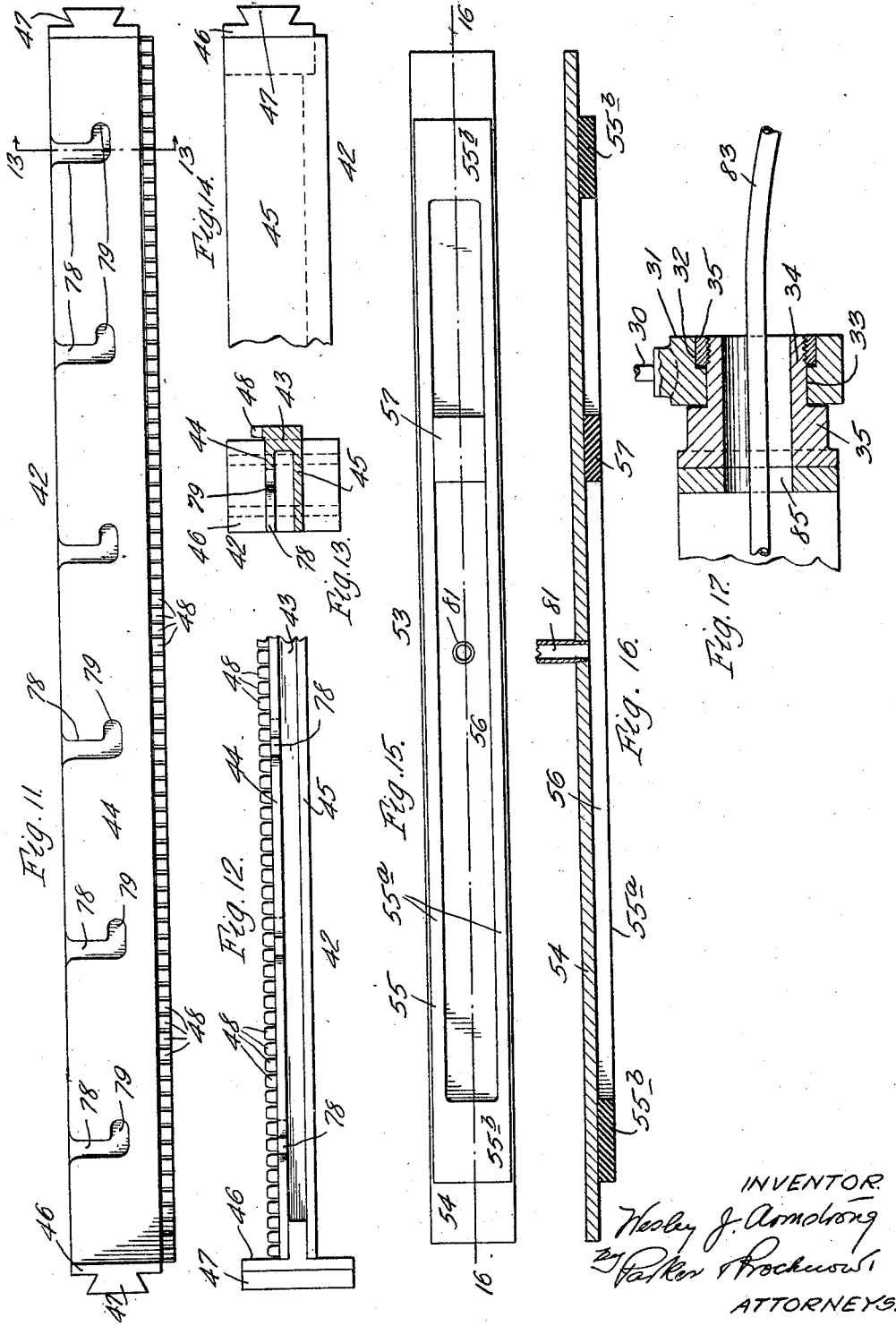
INVENTOR
Wesley J. Armstrong
by Parker Prockwowi
ATTORNEYS.

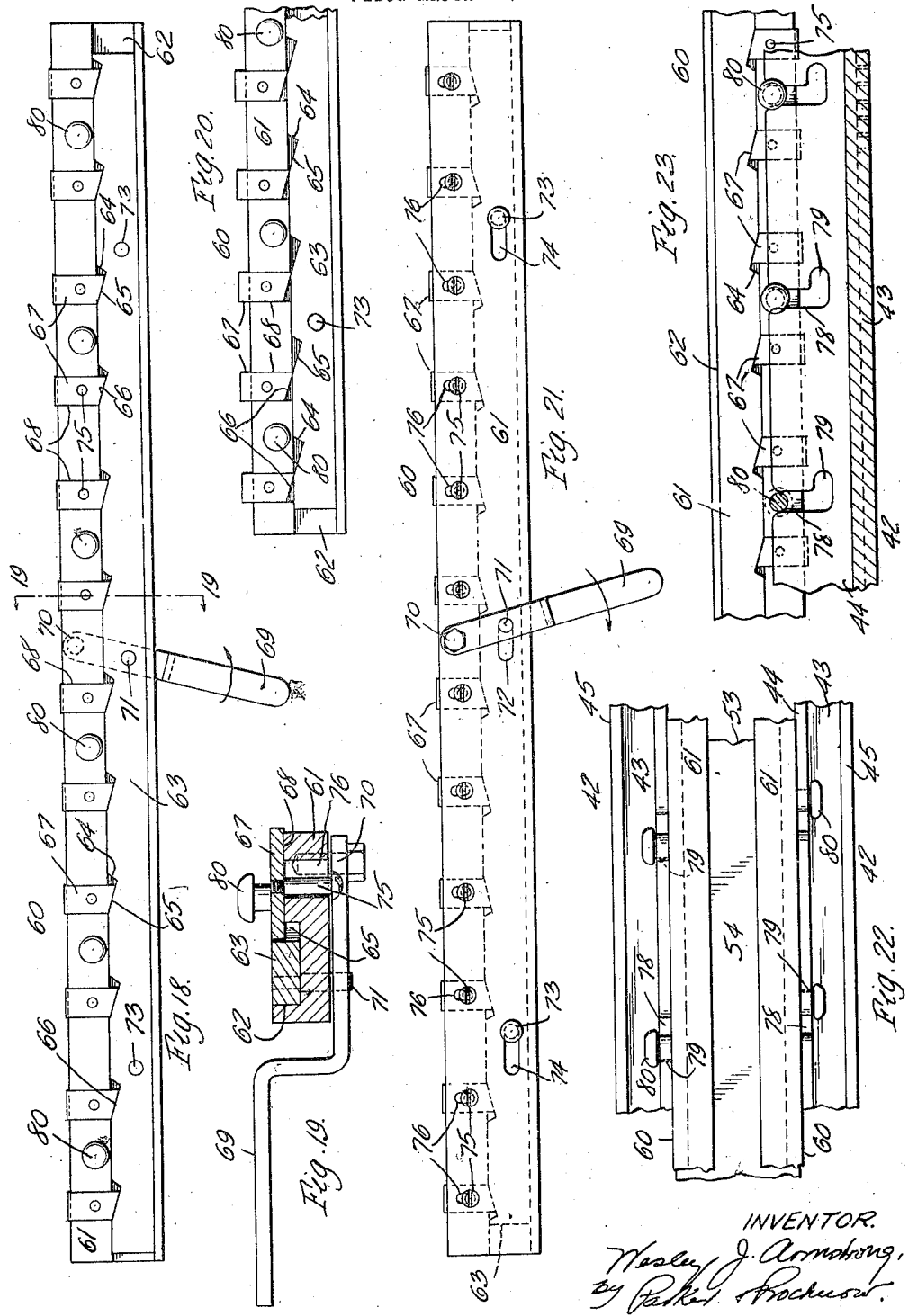

Patented Jan. 4, 1927.

1,613,217

UNITED STATES PATENT OFFICE.

WESLEY J. ARMSTRONG, OF BUFFALO, NEW YORK, ASSIGNOR TO McKINNON DASH COMPANY, OF BUFFALO, NEW YORK.

APPARATUS FOR TESTING RADIATOR CORES.

Application filed March 19, 1925. Serial No. 16,666.

This invention relates to an apparatus for testing the cores of automobile radiators and analogous structures.

Various devices have been proposed for testing completely assembled radiators by immersing the radiator in water and introducing compressed air, or the like, into the same.

The provision of apparatus for testing such completed radiators is a comparatively simple matter, as it is only necessary to plug the usual water inlet and outlet and the filler opening and provide means for the entrance of the testing fluid.

In cases, however, where manufacturers of radiators and radiator cores ship out the cores to other manufacturers or users without any frame parts attached, it is desirable that the cores themselves be tested before shipment.

While the present invention is primarily intended for use in the testing of radiator cores, nevertheless certain features of the invention may be used in connection with the testing of complete radiators.

As is well known, the cores are usually made of very thin, ductile metal such as sheet brass, copper or the like, and one of the difficulties in testing cores of this character is that of providing means for sealing the opposite ends of the core so as to provide chambers communicating with the water passages of the cores to make a closed circuit into which compressed air or other testing medium can be introduced, and at the same time prevent the bending in or collapsing of the thin end walls of the cores by the pressure exerted against their outer faces.

The principal object of the invention is to provide a radiator core testing apparatus having means whereby the cores may be mounted and supported in such a manner that pressure exerted against the end walls of the core will be resisted by rigid parts of the apparatus, so as to prevent injury to, or collapse of the thin end walls of the core.

Other objects are to provide a simple, easily operated apparatus for this purpose which can be easily and quickly adjusted, so that cores of different dimensions may be secured therein for testing; also to provide a portable apparatus of this sort having means whereby the apparatus, with a radiator core mounted therein, may be quickly immersed in a suitable tank, or the like, containing water, so that when the air pressure is admitted to the core, leakages in one face of the core may be readily detected, and the apparatus quickly reversed and again submerged, so that the opposite face of the core may be tested and examined, and also to construct an apparatus of this sort having core supporting means adapted to engage the cores in such a manner that both faces of the cores are unobstructed.

Further objects of the invention are to provide an apparatus of this sort having novel gaskets or core end sealing devices provided with portions which are adjustable to permit the gaskets or sealing devices to be adapted to cores of different sizes; also to provide novel clamping means adapted to be pressed against said gaskets to force the same tightly against the end walls of the cores, so as to form airtight chambers at each end of the cores which communicate with the water passages therein to form a closed circuit into which compressed air or other testing medium may be introduced; also to provide supporting bars or devices of novel construction on which the cores are adapted to be placed, and which are also adapted to support the gaskets or sealing devices and the clamping means therefor.

Another object is to construct an apparatus of this sort in which the supporting bars or devices are slidably and adjustably mounted so as to be movable in two directions, thereby accommodating cores of different lengths or of different thicknesses, and to provide a number of the gaskets or sealing means of different widths adapted to cooperate with the supporting bars when adjusted for the different thicknesses of cores, and which are so proportioned that they will form closed air chambers of the correct size for the different sizes of core.

Other objects are to provide an apparatus of this sort which is portable so as to be easily lifted and moved about, and to provide an apparatus embodying other novel features hereinafter specified and claimed.

In the drawings:

Fig. 3 is a plan view, on an enlarged scale, of the apparatus with a radiator core mounted therein.

Fig. 4 is an end elevation thereof.

Figure 5:
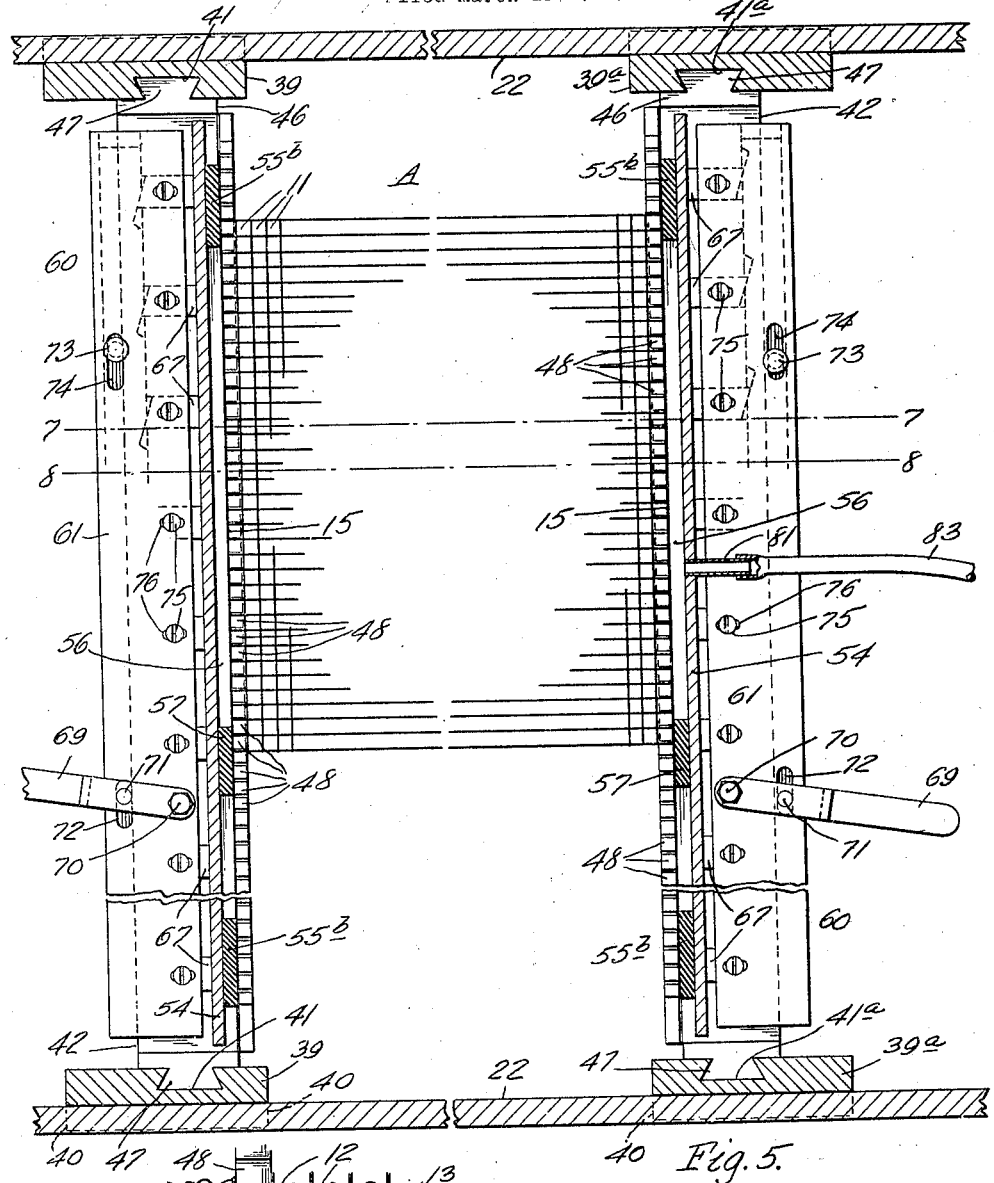
Fig. 5 is a horizontal section of the apparatus with a radiator core mounted therein, on line 5—5 of Fig. 7.
Figure 6:
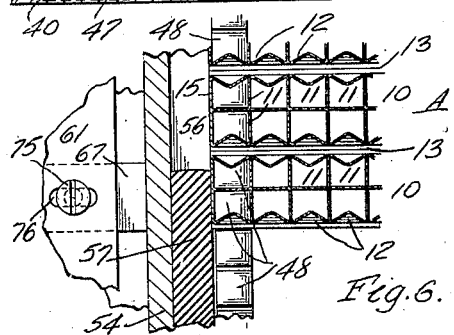
Fig. 6 is an enlarged view of a portion of Fig. 5.

Figs. 7 and 8 are transverse, sectional elevations on lines 7—7 and 8—8 respectively, Fig. 5, and on an enlarged scale.

Fig. 9 is a fragmentary sectional elevation, on a still larger scale, showing the means for supporting an end wall of the core against the pressure exerted by the sealing gasket and clamping means.

Fig. 10 is a longitudinal, sectional elevation of the apparatus on an enlarged scale, showing two of the supporting bars with the radiator core mounted thereon, but with the sealing gaskets and clamping devices omitted.

Fig. 11 is a plan or face view of one of the supporting bars.

Fig. 12 is a fragmentary view of the outer side thereof.

Fig. 13 is a transverse vertical section thereof on line 13—13, Fig. 11.

Fig. 14 is a fragmentary plan view thereof showing the opposite side to that illustrated in Fig. 11.

Fig. 15 is a face view of one of the sealing gaskets of the apparatus.

Fig. 16 is a horizontal section thereof on line 16—16, Fig. 15.

Fig. 17 is a transverse, sectional elevation of the swivel connection between the rigid frame of the apparatus and the lifting or supporting bail thereof.

Fig. 18 is a plan view of one of the clamping devices or members which is used for exerting pressure against the sealing gaskets.

Fig. 19 is a transverse, sectional view thereof, on an enlarged scale on line 19—19, Fig. 18.

Fig. 20 is a fragmentary view similar to Fig. 18 showing the parts in a different position.

Fig. 21 is a plan view thereof showing the opposite face to that shown in Fig. 18.

Fig. 22 is a fragmentary side elevation showing the means for supporting the clamping devices in operative position on the supporting bars.

Fig. 23 is a fragmentary horizontal section showing one of the clamping devices about to be connected to one of the supporting bars.

The apparatus of this invention is primarily adapted for use in testing radiator cores of the "honeycomb" type, but it should be understood that the invention is not limited to this use, as it may be adapted for use in testing certain other types of radiator cores and other analogous structures.

Figure 1:
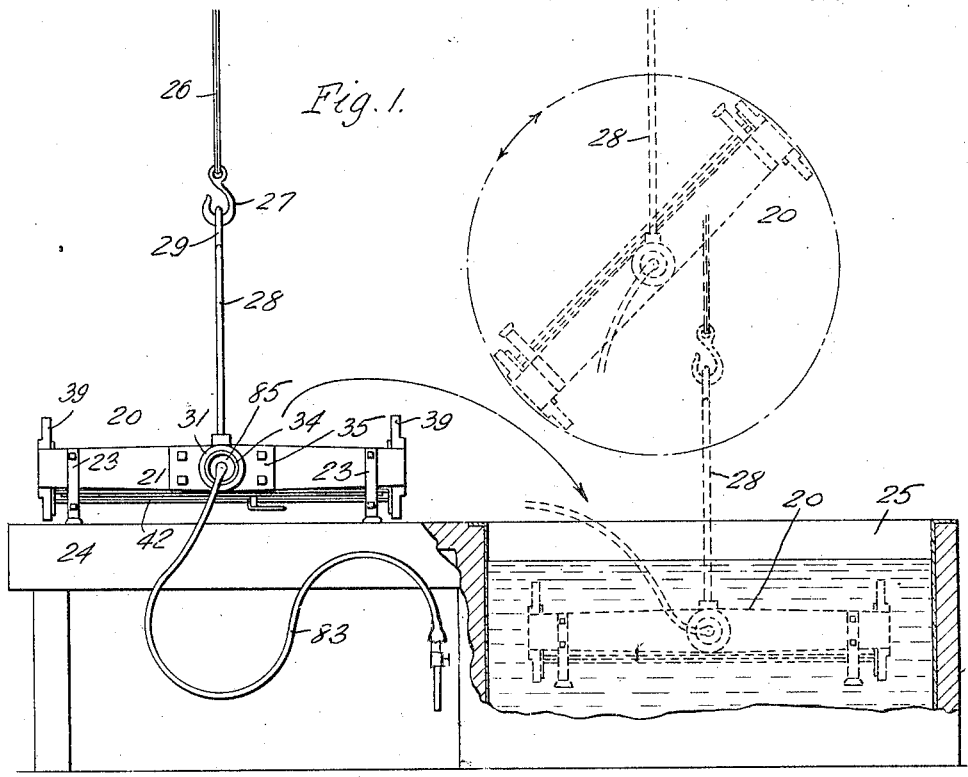
Fig. 1 is a side elevation of a core testing apparatus embodying the invention arranged adjacent to a water tank and showing in broken lines the apparatus submerged in said tank, and exposing one side of the core; and also in broken lines, the apparatus being rotated above the tank, so as to expose the other side of the core.
Figure 2:
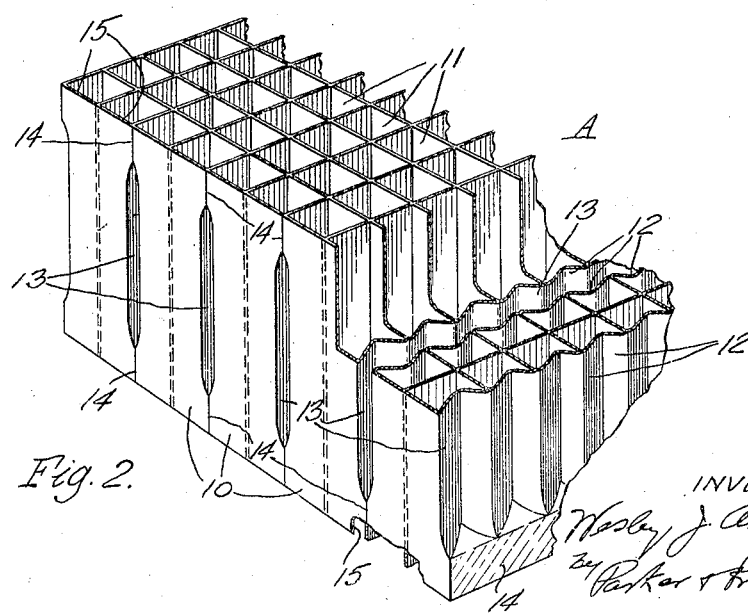
Fig. 2 is a perspective view, partly in section, showing a portion of a radiator core of the "honeycomb" type, with which the apparatus is particularly adapted to be used.

For the purpose of clearly illustrating the invention, a portion of a radiator core of the "honeycomb" type is shown in Fig. 2, and the parts thereof will be briefly described.

The core A includes a plurality of sections 10 which usually comprise a double row of polygonal air passages 11 extending from one face to the other of the core, said sections being indented or pressed inwardly at 12 between their front and rear faces to provide the continuous water passages 13 which extend from one end to the other of the radiator core, and which, in the assembled radiator, connect with the water inlet and reservoir and water outlet compartment at opposite ends. The sections are usually provided adjacent their opposite faces with straight flat portions or faces 14 so formed that when the sections are assembled side by side, these faces 14 will abut and the sections are then clamped or temporarily held securely together and dipped in solder, so as to permanently connect these abutting faces and thereby close the opposite sides or edge portions to form the water passages. When the core is completed, it has the thin walls 15 at each end, formed by the side walls of the outer rows of air passages 11. The soldered joints at the sides of the water passages are sometimes imperfectly sealed or closed by the solder, and the apparatus of the present invention is designed to enable such imperfections to be discovered by immersing the apparatus with the core mounted thereon in water, and subjecting the water passages to air under pressure.

The apparatus preferably includes a rigid rectangular frame 20 having a pair of opposite end bars 21, opposite guide rails 22, and supporting legs or parts 23 secured to the end rails 21 so that the apparatus may be placed on a bench 24 or other suitable support.

The bench is preferably arranged adjacent a water tank or trough 25, and the frame 20 is provided with a suspension member adapted to be engaged by suitable lifting means, such as the cable 26, and hook 27, for lifting the apparatus, with a radiator core mounted therein, from the bench 24 and moving it over the tank 25, so that it may be immersed therein.

In the construction shown, the suspension member is in the form of a bail 28 having a central loop or ring 29 adapted to be engaged by the hook 27, the legs 30 of the bail being rigidly secured in annular bearing rings or sleeves 31 (see Figs. 3 and 4). Each sleeve (see Fig. 17) is formed with an annular recessed shoulder 32 on its outer side, which connects with a circular bore 33 extending through the ring and which is adapted to receive a bearing stud or journal 34 on a bracket 35, one of which is secured centrally of each of the end bars 21, as shown.

The bearing studs 34 are each exteriorly threaded, so as to receive a retaining ring 35, which enters the shouldered recess 32 to hold these parts in engagement, and permits the frame 20 to be rotated in the bearing rings 31 relatively to the bail 28 so as to expose opposite sides of the cores mounted in the apparatus.

As shown in Figs. 3, 4 and 10, the guide rails 22 of the frame 10 are formed with beveled edges 38, and each of these rails has slidably mounted thereon a pair of slides 39 and 39$^a$, each of which is formed with dovetailed horizontal recesses 40 adapted to receive the dovetailed guide rails 22 so that the slides can be moved laterally in opposite directions on the apparatus.

The two slides 39 are further provided with vertical dovetailed recesses 41 and the slides 39$^a$ with similar recesses 41$^a$. These recesses 41, 41$^a$ are formed on the inner faces of the slides and are adapted to receive the dovetailed ends of core supporting bars 42.

The supporting bars 42 are all alike, and each bar comprises a substantially U-shaped longitudinal bar having a relatively thick web 43 and flanges 44 and 45. The bar is provided at each end with a vertical guide portion 46 having a dovetailed part 47. These supporting bars are constructed and adapted to engage with the opposite end portions of the radiator cores to support them in the apparatus in such a manner that the core faces will be unobstructed, and are preferably provided with means for engaging the inner faces of the end walls of the core so as to prevent them from being injured in the apparatus.

For this purpose, the web portion 43 of each of the supporting bars is provided with a plurality of short prongs or spaced abutments 48, which are preferably so shaped so as to enter the opposite end rows of the air passages in the core, and have flat faces 49 which abut squarely against the inner faces of the end walls.

When it is desired to mount one of the cores A in the apparatus, one of the supporting bars 42 is connected to each pair of slides 39, 39$^a$ by engaging the dovetailed portions 47 of the bars in the complementary recesses 41. 41$^a$ in the slides in such a manner that the prongs 48 of each bar extend upwardly and face toward the center of the apparatus and with the flanges 44 and 45 extending outwardly.

The guide recesses 41, 41$^a$ of the slides are closed by stops or shoulders 50 (see Fig. 10) and the lower ends of the guide portions 47 of the two bars 42 engage these stops and the bars are thus positioned and supported on the frame 10.

A core is now taken and placed in the apparatus between the bars 42 so as to engage the prongs 48 of one of the bars 42 in the lower portions of the adjacent end row of air passages 11 with the faces 49 engaging the inner side of the adjacent core end wall 15. The other bar 42 is now so positioned by moving the slides in which it is disposed so that the bottom portions of the end row of air passages at the other end of the core may be engaged over the prongs 48 of this bar with the faces 49 engaging the inner side of the other core end wall 15.

In this manner, cores of different lengths may be readily positioned on the apparatus by moving the slides 39, 39$^a$ and attached bars 42 laterally on the frame 10. The bars are firmly supported on the slides and by the engagement of the prongs 48 in the polygonal air passages 11 at each end of the cores, and a firm and rigid support is assured for the cores.

If now another pair of bars 42 are arranged in the slides 39 and 39$^a$, but with their prongs 48 extending downwardly, these prongs will be guided into the upper portions of the end rows of the air passages 11 as the bars are lowered. These two bars will therefore be supported by the core, and will tie the core rigidly in the frame, in cooperation with the first pair of bars.

The core is thus arranged in the apparatus with the opposite edge portions of each core end wall engaged at the inner sides by the flat faces or abutments 49 of the prongs 48, and as these prongs are substantially as wide as the width of the air passages, a substantially continuous support or abutment is provided along the inner sides of the core end walls.

Means are provided for engaging the outer faces of these edge portions of the core at each end so as to form closed chambers at each end of the core, which communicate with the liquid passages 13 of the core and form a closed circuit into which the compressed air or other testing fluid can be admitted. For this purpose, gasket members 53 are provided. Each gasket member comprises a rigid, flat plate or strip 54 on one face of which a yielding gasket or sealing portion 55 is secured.

This sealing portion 55 is of hollow rectangular formation having parallel side portions 55$^a$ and connecting end portions 55$^b$ adapted to provide a rectangular hollow recess or chamber 56.

The gasket members 53 are preferably made adjustable to accommodate cores of different widths, and for this purpose a movable and adjustable yielding block 57 is arranged in the chamber 56 of each gasket and is adapted to slide in the chamber from one end thereof to the other. The face of the block 57 is flush with the face of the sealing member 55.

Two of these gasket members 53 are provided for use with each width of core. After the core has been arranged on the supporting bars 42, as described, one of the gasket members 53 is arranged on edge between each pair of the bars, so that the sealing portion 55 faces toward one of the end walls of the core, with one of the connecting ends 55$^b$ of the member 55 engaging the outer section of the core at one side, and the side portions 55$^a$ extending along the end wall opposite the prongs 48. The slidable block 57 is then moved to a position in which it will engage the opposite end section of the core, thus forming a closed chamber the sides of which bound the end of the core with the adjacent ends of the water passages 13 connecting with this chamber.

Another gasket member 53 is then arranged at the opposite end of the core between the other pair of bars 42 so as to engage the outer face of the end wall thereof, as above, and form a closed chamber at this end of the core which connects with the water passages and the closed gasket-formed chamber 56 at the other end.

The supporting bars 42 and gasket members 43 are made sufficiently long to accommodate the widest cores to be tested, and the movable yielding blocks 57 are slid along in the chambers 56 of the gaskets to properly seal the different cores, and when cores of the largest size are to be tested, the sliding blocks 57 are removed and the opposite end portions 55$^b$ are engaged directly with the side sections at each end of the cores.

Means are provided for supporting the gasket members 53 in operative position and pressing them firmly against the ends of the core, so that the yielding side portions 55$^a$ thereof engage the outer faces of the core end walls directly opposite to the prongs 48 of the supporting bars.

For this purpose, clamping bars or devices 60 are provided. Each of these devices comprises a rigid bar 61 recessed longitudinally at 62 for the reception of a longitudinally movable slide 63.

This slide is formed on its inner edge with a plurality of notches 64 having inclined cam faces 65 adapted to engage complementary faces 66 formed on the inner ends of slidable fingers or plates 67 arranged in transverse grooves 68 of the bar 61, with their outer ends normally disposed approximately flush with the outer edge or face of the bar 61.

By moving the slide 63 to the right in Fig. 18, the inclined cam faces 65 thereof will engage and force the fingers 67 outwardly transversely of the clamping member, as shown in Fig. 20. For operating the slide, a hand lever 69 pivoted at 70 on the bar 61 is provided.

This lever is adapted to engage a pin 71 secured on the slide and which extends through a longitudinal slot 72 in the bar 61, and which slot is adapted to permit a limited movement of the slide in opposite directions. Additional guide pins 73 and slots 74 may be provided for guiding the slide in its movements.

The fingers 67 may be movably retained in the recesses 68 of the bar 61 by means of screws 75 fixed to the fingers and extending through transverse slots 76 in the bar 61.

The supporting bars 42, and the clamping devices 60 are provided with interfitting parts adapted to permit the clamping devices to be detachably secured on the bars 42 adjacent and in operative relation to the gasket members 53, so that the fingers 67 may be operated to forcibly engage the backs of the gasket members and compress the yielding gaskets against the core end walls. For this purpose, the supporting bars 42 are each provided with a plurality of open-ended transverse slots 78 formed in one of the flanges of the bar, for instance, the flange 44, and each slot is formed with an offset portion 79 extending substantially at right angles, or longitudinally of the supporting bars, and the clamping devices 60 are each provided with a plurality of short, headed studs 80, the shanks of which are adapted to seat in the offset portions 79.

By presenting the clamping devices 60 to the supporting bars 42, as shown in Fig. 23, so as to enter the shanks of the studs 80 into slots 78, and then moving the clamping devices laterally, the studs will be engaged in the offset portions 79 of the slots, and the outer ends of the fingers 67 will be disposed adjacent the backs of the plates 54 of the gasket members, in alinement with the yielding portions 55$^a$ and the prongs 48.

If now the levers 69 are moved so as to force the fingers outwardly in their slots, the ends of these fingers will be forcibly engaged with the backs of the gasket members so as to press the yielding portions 55 thereof firmly against the end walls of the core.

Outward movements of the clamping devices are prevented by the engagement of the studs 80 in the offset portions 79 of the slots 78, and as the supporting bars 42 are of rigid and strong construction, and are themselves prevented from moving away from the core by the engagement of the prongs 48 in the air tubes 11, there will be no bending or flexing of the supporting bars, clamping devices and gaskets, and a firm, secure seal will be formed between the gasket members and the ends of the core.

By constructing the clamping devices 60 so that they may be mounted on the supporting bars 42 in the manner described, the movable fingers 67 thereof will always engage the backs of the gasket members directly opposite to the yielding portions 55ª and as the gasket members are formed of different widths so as to correspond with the thickness of the core which is to be tested, the pressure exerted by the fingers 67 or the gaskets will always be directly opposed by the faces 49 of the prongs, thus positively preventing the end walls 15 of the cores from being crushed or otherwise injured.

One of the gasket members of each pair is provided with an outwardly extending pipe or tube 81 communicating with the air chamber 56 of this gasket, said pipe being adapted to be attached to an air hose 83, or the like, whereby the testing fluid or medium may be admitted to the air chambers 56 of the gaskets and the water passages 13 of the core communicating therewith.

Preferably, the bearing portions 34 of the frame 20, before mentioned, are formed with a central bore or passage 85, and the air pipe 81 and hose 83 extend through one of these passages 85 to the gasket member, thus permitting the apparatus to be turned end for end on the bearing members without twisting the air hose and interfering with the air supply or other testing medium.

While the described apparatus is particularly adapted for use in testing radiator cores, nevertheless certain features thereof may be used in connection with the testing of complete radiators. For instance, a complete radiator could be mounted in a portable apparatus of this general nature with both faces of the radiator exposed and unobstructed, and the apparatus then moved as a unit to the testing position. After one face of the radiator has been tested or inspected, the apparatus could be reversed to expose the other face without disturbing the parts of the apparatus or the radiator.

I claim as my invention:

1. In an apparatus for testing radiator cores and the like, the combination of supporting members for the cores, said members being provided with means for engaging the opposite faces of the thin end walls of the cores in a manner to protect the same against injury on said apparatus.

2. In an apparatus for testing radiator cores and the like, the combination of supporting members for the cores, means engaging the outer faces of the thin end walls of the cores to provide sealed spaces communicating with the water passages thereof to permit the admission of a testing medium thereto, and means for engaging the inner faces of said walls to brace and protect the same against deformation by said engaging means.

3. A portable apparatus for testing radiator cores and the like by a suitable testing medium, said apparatus being adpted to rest on a support to permit the cores to be secured thereon, said apparatus being constructed so as to be moved as a unit with the cores thereon and submerged in a liquid, means for suspending said apparatus with said cores thereon while submerged, and means on said apparatus for sealing the opposite ends of the cores to form sealed spaces communicating with the water passages in the cores to permit the testing medium to be applied thereto.

4. In an apparatus for testing radiator cores and the like, the combination of supporting members on which the cores are secured, means adapted to engage and seal the ends of the cores to permit a testing medium to be admitted to the water passages in said core, and means on said supporting members adapted to resist pressure exerted by said sealing means on the cores to prevent injury to said cores.

5. A portable apparatus for testing radiator cores and the like, adapted to rest on a support to secure the cores therein, adjustable supporting means on said apparatus adapted to permit cores of different sizes to be secured therein and which are adapted to admit a testing fluid to said cores, said apparatus being constructed so as to be moved as a unit to a position in which the cores are to be tested, and means for suspending said apparatus during the testing operation.

6. In an apparatus for testing radiator cores and the like, the combination of supporting members on which a core is adapted to be secured with both faces thereof exposed and unobstructed, said supporting members being constructed to admit a testing fluid, and means for mounting said apparatus in a manner such that successive faces of the core can be presented for inspection without interrupting the supply of testing fluid thereto.

7. In an apparatus for testing radiator cores and the like, the combination of a rigid frame, supporting members mounted on said frame and on which a core is adapted to be secured with both faces thereof exposed and unobstructed and to be connected with a source of testing fluid, suspending means for permitting the apparatus to be lifted, and a pivotal connection between said frame and said suspending means to permit said frame to be rotated relatively to said suspending means to permit each face of said core to be inspected.

8. In an apparatus for testing radiator cores and the like, the combination of a rigid frame, spaced supporting members mounted on said frame and having a plurality of alined and spaced prongs adapted to enter the open ends of the transverse air passages at each end of a core to position and support the core on said frame, means engaging the opposite end walls of the core and adapted to form sealed spaces communicating with the water passages therein to permit the introduction of a testing medium into said core, and said prongs being adapted to protect said end walls from injury by said sealing means.

9. In an apparatus for testing radiator cores and the like, the combination of a rigid frame, spaced supporting members extending across said frame from one side to the other and movable toward and from each other to support cores of different sizes, said members having parts for engaging the ends of a core to position and support the same on said frame, means engaging the end walls of the core to form sealed spaces communicating with the water passages therein to permit the introduction of a testing medium into the core, and said core engaging parts being adapted to protect said end walls from injury by said sealing means.

10. In an apparatus for testing radiator cores and the like, the combination of a rigid frame, spaced supporting members extending across said frame from one side to the other and movable toward and from each other to support cores of different sizes, said members having parts for engaging the ends of a core to position and support the same on said frame, yielding gasket members adapted to engage the outer faces of the end walls of the core to form sealed chambers communicating with the water passages therein and permit the introduction of a testing medium into said core, clamping devices adapted to engage said gasket members to press the same closely against said core end walls, and said core end engaging parts of said supporting members being adapted to abut against inner faces of said core end walls to resist the pressure against said walls exerted by said clamping devices and gasket members.

11. In an apparatus for testing radiator cores and the like, the combination of a rigid frame, spaced supporting members mounted on said frame and having a plurality of alined and spaced prongs adapted to enter the open ends of the transverse air passages at each end of a core to position and support the core, gasket members engaging the outer faces of the end walls of the core to form closed chambers communicating with the water passages in said core to permit the introduction of a testing medium into said core, and said prongs on said supporting members being adapted to abut against the inner faces of said end walls to prevent injury thereto by said gasket members.

12. In an apparatus for testing radiator cores and the like, the combination of a rigid frame, spaced supporting members mounted on said frame and having a plurality of alined and spaced prongs adapted to enter the open ends of the transverse air passages at each end of a core to position and support the core, gasket members engaging the outer faces of the end walls of the core to form closed chambers communicating with the water passages in said core to permit the introduction of a testing medium into said core, clamping devices adapted to engage said gasket members and press the same closely against said core end walls, and said prongs on said supporting members being adapted to abut against the inner faces of said core end walls to resist the pressure exerted by said clamping devices and gasket members.

13. In an apparatus for testing radiator cores and the like, the combination of a rigid frame, spaced supporting members mounted on said frame and having a plurality of alined and spaced prongs adapted to enter the open ends of the transverse air passages at each end of a core to position and support the core, a gasket member adjacent each of said supporting members, each gasket member comprising a rigid plate and a substantially rectangular yielding gasket secured thereto and adapted to engage the outer edge portions of the core end wall to form a closed chamber communicating with the water passages in said core, clamping means engaging said rigid plate and adapted to exert pressure thereon to compress said yielding gasket, and said prongs on said supporting members being adapted to engage the inner faces of said core end walls to resist the pressure exerted by said clamping means and said gaskets to prevent injury to said walls.

14. In an apparatus for testing radiator cores and the like, the combination of rigid means for supporting a core and including spaced parts adapted to enter the ends of the transverse air passages at each end of the core, a gasket member adjacent each end of said core, each of said gasket members comprising a rigid plate and a substantially rectangular yielding gasket secured thereto and adapted to engage the outer edge portions of the core end wall to form a closed chamber communicating with the water passages in said core, and means for compressing said yielding gaskets, and said spaced parts on said rigid core supporting means being adapted to resist said pressure to prevent injury to said core and walls.

15. In an apparatus for testing radiator cores and the like, the combination of rigid means for supporting a core and including spaced parts adapted to enter the ends of the transverse air passages at each end of the core, a gasket member adjacent each end of said core, each of said gasket members comprising a rigid plate, and a yielding gasket having spaced, parallel, narrow parts adapted to engage the side edge portions of the core end wall, a part integral therewith adapted to engage one end portion of said core end wall and an adjustable part adapted to engage the other end portion of said core end wall whereby said gasket members may be used with cores of different widths to form closed chambers communicating with the water passages therein, means for compressing said gaskets, and said spaced parts on said supporting members being adapted to resist said pressure to prevent injury to said core end walls.

16. In an apparatus for testing radiator cores and the like, the combination of rigid means for supporting a core and including spaced parts adapted to enter the ends of the transverse air passages at each end of the core, a gasket member adjacent each end of said core, each of said gasket members comprising a rigid plate and a yielding gasket having spaced, parallel, narrow parts adapted to engage the side edge portions of the core end wall, a part integral therewith adapted to engage one end portion of said core end wall, and an adjustable part adapted to engage the other end portion of said core end wall whereby said gasket members may be used with cores of different widths to form closed chambers communicating with the water passages therein, means for compressing said gaskets to seal said chambers and water passages to form a closed circuit, and means for introducing a testing means into said circuit.

17. In an apparatus for testing radiator cores and the like, the combination of rigid means for supporting a core and including spaced parts adapted to enter the ends of the transverse air passages at each end of the core, a gasket member adjacent each end of said core, each of said gasket members being adjustable to permit them to be used with cores of different widths, said gaskets being adapted to seal the ends of the cores and form air chambers connecting with the water passages in the cores, means for compressing said gaskets, and said spaced parts on said core supporting means being adapted to brace the core end walls against deflection by the pressure of said compressing means and said gaskets.

18. In an apparatus for testing radiator cores and the like, the combination of a rigid horizontal frame having opposite parallel guide rails, a pair of slides mounted on each rail and movable longitudinally thereof, a core supporting bar connected to opposite slides of each pair and movable with said slides toward and from each other, a series of spaced parts on each end bar adapted to enter the ends of the transverse air passages at opposite ends of the core to support the core, means engaging the end walls of the core to form closed spaces connecting with the water passages in said core, and means for introducing a testing medium to the core, said spaced parts on said supporting bars being adapted to prevent injury to said end walls.

19. In an apparatus for testing radiator cores and the like, the combination of a rigid horizontal frame having opposite parallel guide rails, a pair of slides mounted on each rail and adapted to slide longitudinally thereon, a vertical guide recess in each slide, core supporting bars extending across said frame between the corresponding slides of each pair and adapted to rigidly support a core, each bar having a part at each end engaging in the guide recess of the adjacent slide so as to be removably connected thereto, a series of spaced prongs at the inner side of each supporting bar adapted to engage the inner face of the adjacent core end wall and maintain the core in operative position with both faces unobstructed, and means engaging the end walls of the core to form closed spaces communicating with the water passages in said core to permit the introduction of a testing medium into said core.

20. In an apparatus for testing radiator cores and the like, the combination of a rigid frame, a pair of parallel, spaced core supporting bars extending across said frame and movable toward and from each other, upwardly extending spaced and alined parts on said bars adapted to engage in the open ends of the end row of air passages of said core on one face thereof, and a second pair of like core supporting bars arranged above said first pair and having downwardly extending spaced and alined parts adapted to engage in the other ends of said air passages, and means arranged between the adjacent pairs of supporting bars for engaging the ends of the core to form closed spaces communicating with the water passages in said core to permit the introduction of a testing medium into said water passages.

21. In an apparatus for testing radiator cores and the like, the combination of a rigid frame, a pair of parallel, spaced core supporting bars extending across said frame and movable toward and from each other, upwardly extending spaced prongs on said bars adapted to enter the open ends of the end row of air passages of said core on one face thereof, and a second pair of like core supporting bars arranged above said first pair and having downwardly extending spaced prongs adapted to enter the other ends of said air passages, means arranged between the adjacent pairs of supporting bars adapted to engage the outer face of the end walls of the core to cut off the water passages from the atmosphere, and said prongs on said supporting bars having flat faces adapted to abut against the inner faces of said core end walls to prevent injury thereto by said end wall engaging means.

22. In an apparatus for testing radiator cores and the like, the combination of a rigid frame, a pair of parallel, spaced core supporting bars extending across said frame and movable toward and from each other, upwardly extending spaced prongs on said bars adapted to enter the open ends of the end row of air passages of said core on one face thereof, and a second pair of like core supporting bars arranged above said first pair and having downwardly extending spaced prongs adapted to enter the other ends of said air passages, a sealing gasket disposed between adjacent pairs of supporting bars and adapted to engage the outer faces of the core end walls and having parts extending substantially in alinement with said prongs on said supporting bars, means for pressing said gaskets against said end walls to form sealed connections with the water passages of said core to permit the introduction of a testing medium into said core, and said prongs being adapted to abut against the inner sides of said core end walls to resist the pressure exerted by said pressure means and gaskets.

23. In an apparatus for testing radiator cores and the like, the combination of a rigid, horizontal frame having opposite parallel guide rails, a pair of slides mounted on each rail and movable longitudinally thereof, a vertical guide recess in each slide, a stop at the bottom of each recess, lower core supporting bars extending across said frame between corresponding slides of each pair and each having end portions adapted to slidably engage in said guide recesses thereof and rest on said bottom stops, upwardly extending parts on said supporting bars adapted to engage the end portions of the core on one face thereof, upper core supporting bars also having end portions slidably engaging in said guide recesses of said slides and having downwardly extending parts adapted to engage the end portions of said core on its opposite face by a downward sliding movement of said bars so as to support said core on said frame between said upper and lower supporting bars.

24. In an apparatus for testing radiator cores and the like, the combination of a rigid, horizontal frame having opposite parallel guide rails, a pair of slides mounted on each rail and movable longitudinally thereof, a vertical guide recess in each slide, a stop at the bottom of each recess, lower core supporting bars extending across said frame between corresponding slides of each pair and each having end portions adapted to slidably engage in said guide recesses thereof, and rest on said bottom stops, upwardly extending parts on said supporting bars adapted to engage the end portions of the core on one face thereof, upper core supporting bars also having end portions slidably engaging in said guide recesses of said slides and having downwardly extending parts adapted to engage the end portions of the core on the opposite face thereof by moving said upper bars downwardly into engagement therewith, whereby cores of different thicknesses may be supported on said frame between said upper and lower supporting bars.

25. In an apparatus for testing radiator cores and the like, the combination of a rigid frame, parallel spaced, core supporting bars extending across said frame and movable toward and from each other, and having parts adapted to engage the opposite ends of a core to support the same, sealing gaskets loosely arranged on said supporting bars and having yielding portions engaging the core end walls to connect the water passages of the core in a closed circuit, a clamping device detachably arranged on each of said supporting bars and having parts adapted to engage the adjacent gaskets and press the same firmly against said core end walls.

26. In an apparatus for testing radiator cores and the like, the combination of a rigid frame, parallel spaced, core supporting bars extending across said frame and movable toward and from each other and having parts adapted to engage the opposite ends of a core to support the same, sealing gaskets loosely arranged on said supporting bars and having yielding portions engaging the core end walls to connect the water passages of the core in a closed circuit, a clamping device extending longitudinally relatively to each of said supporting bars and adapted to be detachably connected thereto, and said clamping devices having a plurality of transverse slidable fingers and means for moving said fingers into engagement with the adjacent gasket to press the same firmly against said core end walls.

27. In an apparatus for testing radiator cores and the like, the combination of a rigid frame, parallel spaced, core supporting bars extending across said frame and movable toward and from each other and having parts adapted to engage the opposite ends of a core to support the same, sealing gaskets loosely arranged on said supporting bars and having yielding portions engaging the core end walls to connect the water passages of the core in a closed circuit, a clamping device extending longitudinally relatively to each of said supporting bars and adapted to be detachably connected thereto, and said clamping device having a plurality of transverse slidable fingers adapted to be moved into engagement with the adjacent gasket, a longitudinally movable slide on said clamping device having parts adapted to engage said fingers and press the same against said gasket when said slide is moved endwise and means for imparting endwise movements to said slide.

28. In an apparatus for testing radiator cores and the like, the combination of a rigid frame, parallel spaced, core supporting bars extending across said frame and movable toward and from each other and having parts adapted to engage the opposite ends of a core to support the same, sealing gaskets loosely arranged on said supporting bars and having yielding portions engaging the core end walls to connect the water passages of the core in a closed circuit, a clamping device disposed longitudinally of each of said supporting bears, a plurality of transverse slidable fingers on each of said devices, means on said devices for pressing said fingers against the adjacent gasket to force the same firmly against said core end walls, and means for detachably securing said clamping devices on said supporting bars including parts on said devices adapted to be received in offset portions of slots in said bars and adapted to prevent movement of said devices away from said gaskets when said pressure is applied.

29. A portable apparatus for use in the testing of automobile radiators and the like structures, means on said apparatus for securing the structure rigidly therein, and means for sealing the fluid passages of the structure against the atmosphere, to permit a testing medium to be introduced into the structure, said apparatus being constructed so as to be moved with said structure thereon as a unit to a position in which the structure is to be tested, and means for suspending said apparatus during said testing operation.

30. A portable apparatus for use in the testing of automobile radiators and the like by a suitable testing medium, said apparatus being adapted to rest on a support to permit the radiator to be secured therein, said apparatus being constructed so as to be moved as a unit with the radiator thereon and submerged in a liquid, means on said apparatus for sealing the radiator against the entrance of atmosphere to the water passages therein and permit the testing medium to be applied thereto, and means for suspending said apparatus while said cores are being tested.

31. An apparatus for testing radiator cores including supporting means for the cores having parts adapted to enter the air spaces of the cores to reinforce the walls of said air spaces, a gasket member adapted to be pressed against the portions of said walls which are reinforced by said supporting means, and means for admitting testing fluid to the water spaces of the radiator cores while the cores are held in said supporting means.

32. An apparatus for testing radiator cores including a gasket member adapted to be pressed against each end of a core to permit testing fluid under pressure to be admitted to the water spaces of the cores, and means entering the air spaces of the cores to reinforce the portions of the air space walls engaged by said gasket member.

WESLEY J. ARMSTRONG.